United States Patent [19]
Chinn

[11] Patent Number: 5,626,750
[45] Date of Patent: May 6, 1997

[54] APPARATUS FOR TREATING A FLUID IN AN ION EXCHANGE PROCESS

[75] Inventor: Alan F. Chinn, Mississauga, Canada

[73] Assignee: Drake Recovery Systems, Inc., Burlington, Canada

[21] Appl. No.: 507,208

[22] Filed: Jul. 26, 1995

[51] Int. Cl.$^6$ .......................... B01D 24/02; B01D 24/12; B01D 24/14; B01D 24/46
[52] U.S. Cl. .......................... 210/275; 210/283; 210/289; 210/291
[58] Field of Search .................... 210/275, 269, 210/289, 291, 286, 283

[56] References Cited

U.S. PATENT DOCUMENTS

| | | | |
|---|---|---|---|
| 899,645 | 9/1908 | Wright | 210/275 |
| 967,554 | 8/1910 | Rarick | 210/289 |
| 1,685,816 | 10/1928 | Kenney | 210/269 |
| 1,706,777 | 3/1929 | Eisenhauer | 210/283 |
| 1,749,422 | 3/1930 | Eisenhauer | 210/289 |
| 2,021,919 | 11/1935 | Montgomery et al. | 210/286 |
| 3,385,783 | 5/1968 | Hunter | 210/35 |
| 3,386,914 | 6/1968 | Hunter | 210/35 |
| 4,186,174 | 1/1980 | Hunter et al. | 423/54 |
| 4,238,325 | 12/1980 | Heskett | 210/678 |
| 4,269,715 | 5/1981 | Barraqué et al. | 210/275 |
| 4,591,436 | 5/1986 | Hofsfede | 210/275 |
| 4,622,141 | 11/1986 | Salem et al. | 210/275 |
| 4,645,604 | 2/1987 | Martinola | 210/275 |
| 4,673,507 | 6/1987 | Brown | 210/681 |
| 4,699,714 | 10/1987 | Eumann | 210/289 |

OTHER PUBLICATIONS

Brown et. al.; Recovery of Nitric Acid From Solutions Used For Treating Metal Surfaces; Feb. 1980; USA.

Brown et. al.; The Recoflo Short Bed Ion Exchange; 1988; Canada.

Dearie et. al.; Design and Operation of Amberpack, A New Packed Bed System For High Efficiency Ion Exchange Processess; 1987; USA.

Bolto et. al.; Wastewater Treatment by Ion–Exchange; 1987; USA.

Amberpack Ion Exchange System Brochure; Sep., 1993; USA.

Recoflo Water Deionization Systems Brochure; 1995; Canada.

Dorfner; Ion Exchangers; 1991; USA.

*Primary Examiner*—Cynthia L. Nessler
*Attorney, Agent, or Firm*—Merek & Voorhees

[57] ABSTRACT

An apparatus for treating a fluid to remove at least part of a component or components from the fluid in a reciprocating flow ion exchange system. The apparatus includes a vessel having a central holding chamber that is enclosed at each end by an end cap. A packed bed of ion exchange particles is held within the central holding chamber through the use of upper and lower retaining means so that a particle free cavity is created above and below the particle bed. The flow of fluid is distributed substantially evenly across the end of the particle bed by the pressure drop through the bed when one of the particle free cavities is filled with pressurized fluid.

9 Claims, 7 Drawing Sheets

APPARATUS FOR TREATING A FLUID IN AN ION EXCHANGE PROCESS

FIELD OF THE INVENTION

This invention relates to an apparatus for treating a fluid in an ion exchange process wherein at least a part of a component or components are removed from the fluid through utilization of a fixed bed of ion exchange particles capable of taking-up the component or components from the fluid and of being regenerated in situ.

BACKGROUND OF THE INVENTION

Reciprocating flow ion exchange systems are used in ion exchange processes for the removal and/or recovery of at least part of a component or components from a fluid by contacting the fluid with ion exchange particles. In the context of this patent, ion exchange particles include ion exchange resins (such as a strong acid cation resin), adsorptive particles (such as zeolites), or such other particles as may form the ion exchange bed in an ion exchange vessel.

U.S. Pat. Nos. 3,385,783 and 3,386,914, both issued to Robert F. Hunter, disclose and discuss the prior art process of reciprocating flow ion exchange. In simplified terms, the process involves the passage of the solution to be treated through a bed of ion exchange particles such that at least a part of the component in question is taken up by the particles and removed from solution. The basic cycle consists of two co-current steps and two counter-current steps, with the solution treatment step being the reference for the other steps. The basic steps are (1) solution treatment, (2) counter-current displacement, (3) counter-current regeneration, and (4) co-current displacement. The solution treatment step consists of processing a predetermined amount of solution corresponding to a specific incremental loading of the bed of ion exchange particles. In the counter-current displacement step interstitial solution, remaining in the ion exchange vessel after the solution treatment step, is displaced in a counter-current direction by introducing regenerant in a direction opposite to the flow of the solution being treated. The regeneration (or elution) step entails continuing the flow of regenerant to regenerate the bed of ion exchange particles by removing at least a part of the loaded component from the ion exchange particles. In the co-current displacement step, interstitial regenerant/product is removed from the ion exchange vessel in a co-current direction by introducing solution that is to be treated into the vessel. Once the interstitial regenerant/product has been removed from the vessel, the flow of solution to be treated continues and the cycle starts again. Depending on the application, rinse steps may also be included, usually before and/or after the regeneration step.

Reciprocating flow ion exchange systems can be differentiated from other counter-current ion exchange systems by their characteristic short, fixed bed of ion exchange particles that are tightly packed at all times so that the ion exchange particles cannot be fluidized, the use of fine mesh ion exchange particles, the low incremental loading of the ion exchange particles, relatively fast flow rates, rapid cyclical operation and counter-current regeneration. The reciprocating flow ion exchange process is also characterized by the use of density effects, where possible, to minimize mixing. That is, the more dense fluid is typically fed into the bottom of the vessel, with the less dense fluid entering from the top. The combination of these features act to achieve a highly efficient process that can be undertaken at a relatively low capital and operating cost.

It will be appreciated that in order to maximize the efficiency of the reciprocating flow ion exchange process, it is essential that during the process, (1) fluid being introduced into the vessel is distributed evenly across the end of the ion exchange bed so that the fluid flows to all portions of the ion exchange bed, (2) there is even flow of fluid as it flows through the ion exchange bed (i.e., plug flow) to minimize mixing, and (3) that there is uniform collection of fluid exiting the ion exchange bed to minimize mixing.

Three of the most critical factors that must be addressed in order to ensure even flow distribution across the end of the bed and even flow through the bed include; the need to maintain a substantially constant bed depth throughout the process and to confine and maintain the ion exchange particles forming the bed in a tight, homogeneously packed condition; the need to maintain each end of the ion exchange bed in a substantially flat configuration to allow even flow across the upper and lower ends of the bed; and, the need to evenly distribute the fluid being introduced into the vessel across the relevant end of the bed so that the entire end of the bed is exposed substantially uniformly to the fluid flowing into the vessel resulting in the entire bed being exposed to the fluid at substantially the same time. It will also be appreciated that to ensure uniform collection of fluid as it exits the ion exchange bed each end of the ion exchange bed must be maintained in a substantially flat configuration so that the plug of fluid exits the bed at substantially the same time. There must also be present a means for collecting the fluid as it exits the bed and to direct it out of the vessel.

Others have addressed these concerns through the introduction of various types of apparati that may be used for the purpose of distributing fluid across each end of the bed, collecting the fluid as it exits the bed, holding each end of the bed in a flat configuration, and for confining or holding the ion exchange particles in a fixed position. For example, in U.S. Pat. No. 4,673,507, issued to Craig J. Brown, a particular form of header is described that includes fluid flow passageways that are said to help distribute fluid across the end of the ion exchange bed and to collect the fluid as it exits the end of the bed. In addition, the header is said to maintain the ion exchange bed in a fixed and packed condition.

The prior art devices that have been proposed for use in a reciprocating flow ion exchange system suffer from various inherent problems and disadvantages. For example, the "header" type devices that have been proposed to date can experience problems with distortion and bulging when high pressures are encountered during the process cycle. For example, at an inlet pressure of 70 psi (such as may be encountered in a water deionization process) the header of a prior art vessel holding a 60 inch diameter ion exchange bed will be subjected to approximately 99 tons of pressure (197,920 pounds). Any distortion or bulging of the header presents a significant problem in the process. The ends of the ion exchange bed are no longer maintained in a flat configuration, the ion exchange bed does not maintain a constant depth, fluid cannot be distributed or collected evenly over the entire end of the ion exchange bed and the integrity of gaskets and seals in the vessel may be compromised leading to leakage. In addition, packing uniformity is compromised resulting in possible flow distribution problems.

As a result of such problems it has been shown in practice that the flat header of prior art devices must be significantly reinforced by steel ribs or other reinforcement means where high internal pressures are to be encountered. Such reinforcing adds significantly to both the weight and the cost of the vessel. This condition becomes more prevalent as the diameter of the vessel, and/or the internal pressure, increases.

A second major disadvantage of the prior art concerns the efficiency and cost of fluid distribution devices. That is, in order to achieve full use of the ion exchange bed and maximize process efficiency, elaborate and costly flow distribution plates have been used to help distribute fluid across the upper and lower ends of the ion exchange bed. While such distribution plates assist somewhat in the distribution of the fluid flowing into the vessel by creating passageways through which the fluid is directed, they nevertheless tend to distribute the fluid to the centre of the ion exchange bed before any fluid reaches the outer edges of the bed. This problem also becomes more prevalent as the diameter of the ion exchange bed increases.

A third disadvantage of the prior art devices concerns the packing of the ion exchange bed in order to obtain a relatively tight, homogeneous packing. Others have suggested loading ion exchange particles in the vessel by overfilling the vessel through mounding or heaping the ion exchange particles over the top of the vessel and using a header to compress and hold the ion exchange particles in place. This method is both imprecise and can lead to overly dense areas in the ion exchange bed, resulting in channelling. A channelling bed is a bed containing loose and/or overly dense areas resulting in pathways being created through which a disproportionate amount of fluid passes. It is therefore critical that care be exercised to ensure a uniform packing density when the ion exchange particles are loaded into the ion exchange vessel, thereby forming the ion exchange bed.

The problem becomes even more prevalent where the ion exchange particles are caused to shrink prior to being loaded into the vessel, as suggested by the prior art. The particles may swell considerably during the ion exchange process, resulting in overly dense areas. Furthermore, loading ion exchange particles by heaping them over the top of the vessel and compressing them in place can result in contamination of seals and gaskets which may result in leakage.

A fourth disadvantage of the prior art is the absence of a device or means for readily removing all or a portion of the ion exchange particles from the assembled vessel. Ion exchange particles can become contaminated by fine particulate material or liquids resulting in their becoming fouled and requiring replacement or cleaning. In addition, it may be desirable to change the type or size of the ion exchange particles being used in the process. It will also be appreciated that in any ongoing operation ion exchange particles have a limited useful life and may at some time require replacement. Previously, the ion exchange particles could not be removed from the vessel without first having to physically disconnect the vessel from the ion exchange system and disassemble the top or bottom to gain access to the ion exchange bed. The ion exchange particles were then physically shovelled or scooped out of the vessel. This method of removing the ion exchange particles from the vessel is both extremely messy and time consuming, resulting in significant downtime, lost production and increased costs.

SUMMARY OF THE INVENTION

The invention therefore provides an apparatus for treating a fluid to remove at least a part of a component or components from the fluid in a reciprocating flow ion exchange system which overcomes these disadvantages of the prior art through the incorporation of a structure which is mechanically strong, relatively lightweight, mechanically simple, has a relatively low capital cost, provides a means for substantially even flow distribution across the upper and lower ends of the ion exchange bed and provides a means for substantially uniform collection of fluid as it exits the ion exchange bed. The invention also provides an apparatus that enables the ion exchange particles to be readily removed, cleaned or replaced without the need to dissemble either the apparatus or the ion exchange system in which it is operating.

Accordingly, the present invention in one of its aspects provides an apparatus for treating a fluid to remove at least part of a component or components from the fluid in a reciprocating flow ion exchange system, the apparatus comprising; a vessel having a central holding chamber with an open upper and an open lower end; two end caps, one end cap enclosing each of said open upper and said open lower ends of said central holding chamber thereby forming an enclosed vessel; a packed bed of ion exchange particles held within said central holding chamber, said ion exchange particles capable of taking-up said component from said fluid and capable of being regenerated in situ; and, upper and lower retaining means to confine said bed of ion exchange particles within said central holding chamber such that said vessel has a particle-free cavity above said upper retaining means and below said lower retaining means, each of said particle-free cavities being in communication with at least one end port, extending through said respective end cap, for introducing or removing fluid from said vessel, wherein the flow of fluid into said vessel is substantially evenly distributed across the end of said bed of ion exchange particles by the pressure drop through said bed of ion exchange particles when one of said particle-free cavities is filled with pressurized fluid.

In another aspect of the present invention, upper and lower support means hold and maintain said upper and lower retaining means in place and the internal surfaces of said ends caps adjacent to said central holding chamber are generally concave.

Further objects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings of the preferred embodiments of the present invention in which.

DESCRIPTION OF THE PREFERRED EMBODIMENT

Figure 1:
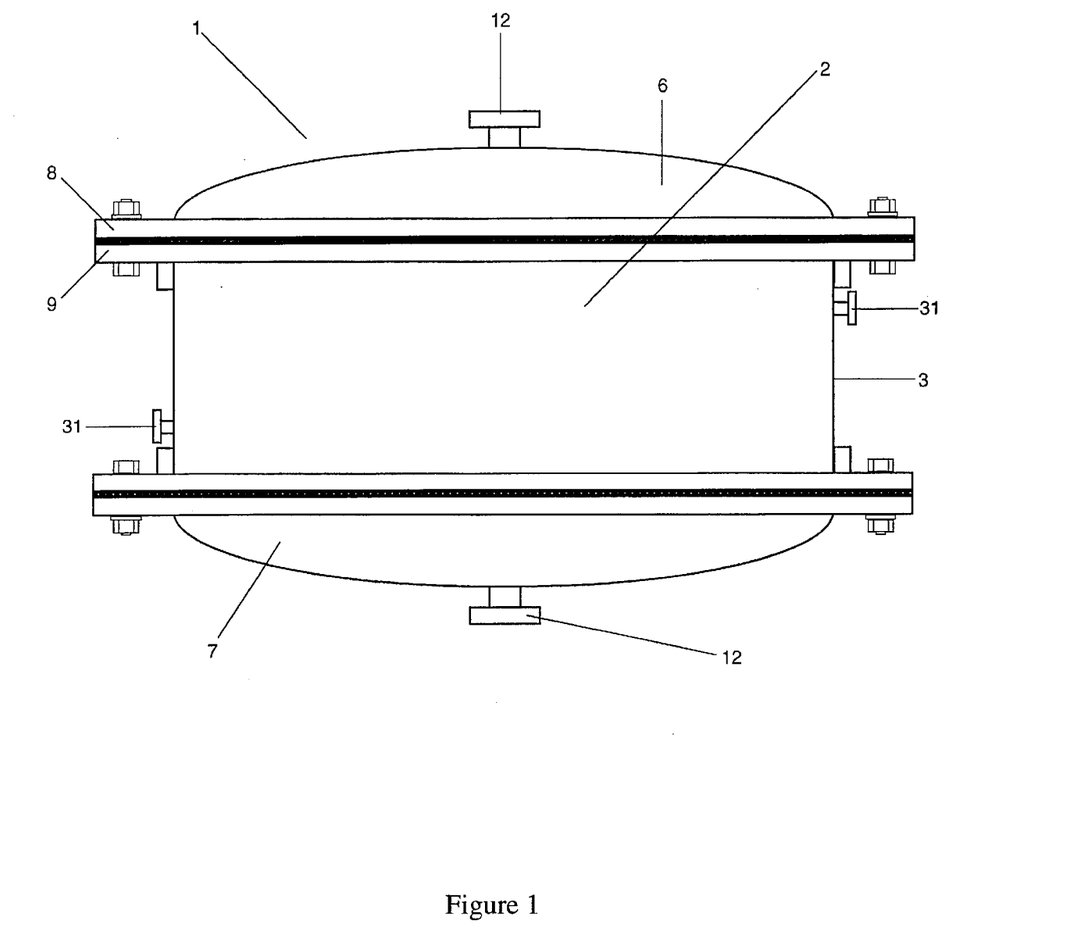
FIG. 1 is a side view of the apparatus for treating a fluid according to the present invention.
Figure 3:
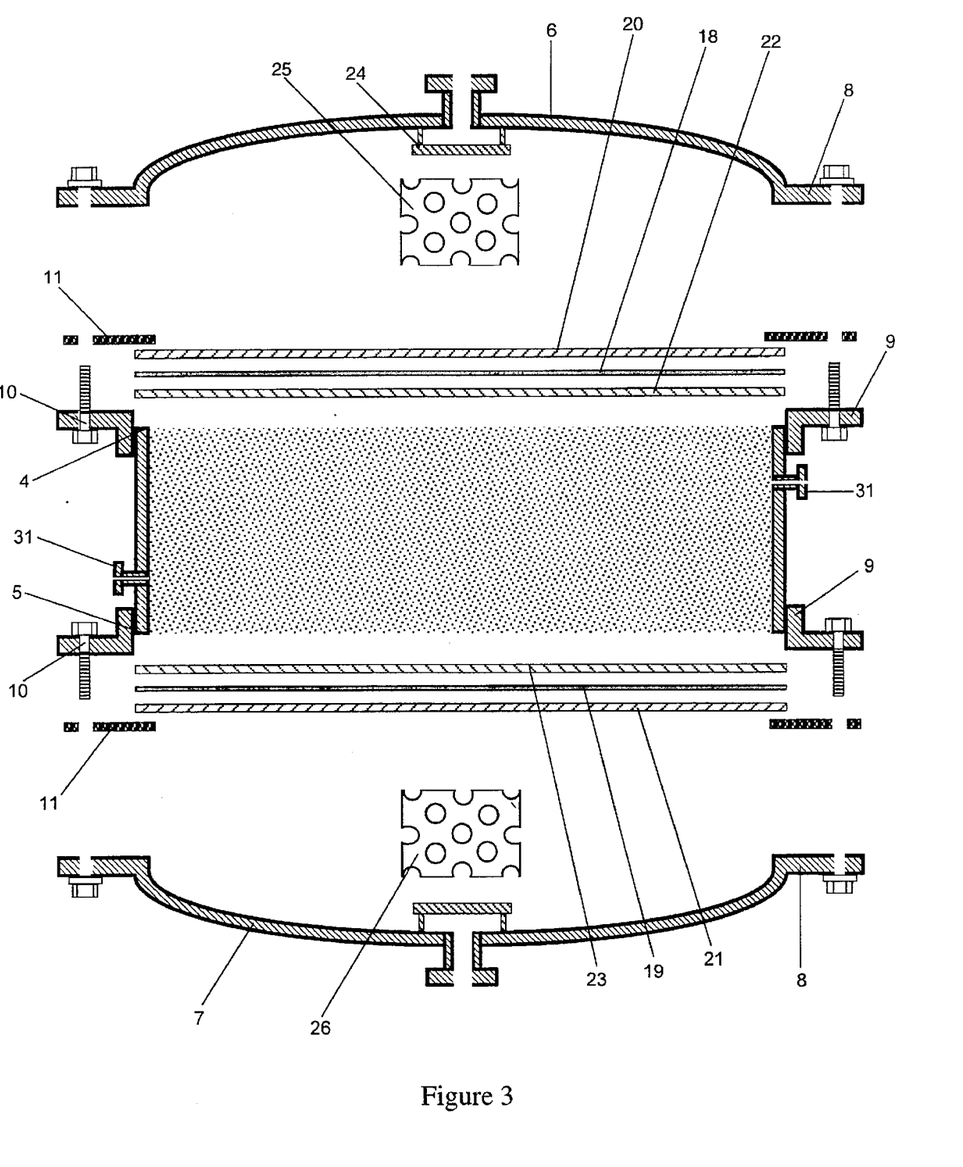
FIG. 3 is an exploded view of the apparatus shown in FIG. 2.

Referring to FIGS. 1 and 3, an apparatus pursuant to the present invention is shown and noted generally by reference numeral 1. The apparatus 1 is comprised of a vessel 2 having a central holding chamber 3. Central holding chamber 3 is preferably cylindrical in shape having a central bore therethrough creating an open upper end 4 and an open lower end 5. However, it will be appreciated that other configurations of central holding chamber 3 could be employed while not detracting from the scope of the invention. Enclosing upper end 4 and lower end 5 of central holding chamber 3 are a pair of upper and lower end caps 6 and 7, respectively. As shown in FIG. 1, with upper and lower end caps 6 and 7 in place central holding chamber 3 becomes an enclosed vessel.

Figure 2:
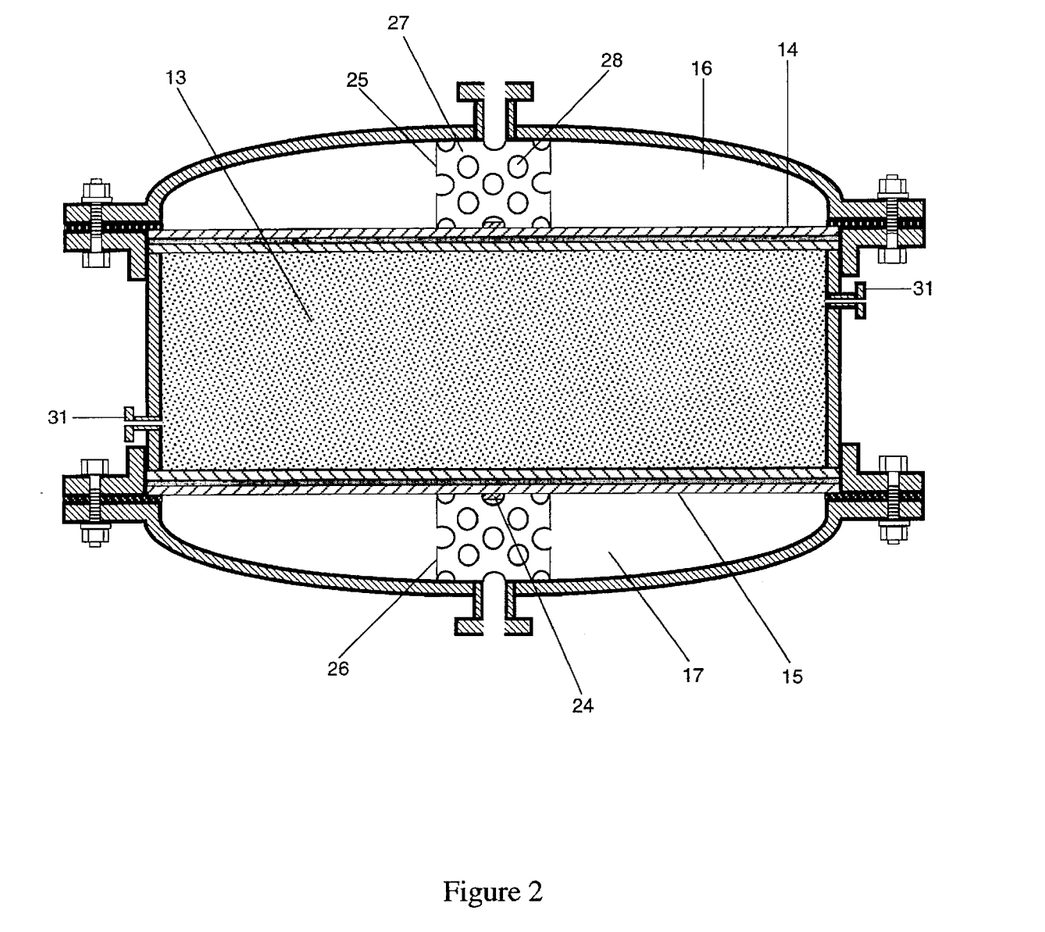
FIG. 2 is a sectional view through the apparatus shown in FIG. 1.

In order to attach upper and lower end caps 6 and 7 to central holding chamber 3, a pair of opposed flange members 8 and 9 are utilized. Flanges 8 and 9 are positioned at each of ends 4 and 5 of central holding chamber 3 in order to secure upper and lower end caps 6 and 7 in place. Flanges 8 are preferably formed in unitary construction with end caps 6 and 7 with flanges 9 being attached to central holding chamber 3. The method of attaching flanges 9 to central holding chamber 3 can vary depending upon the material from which the respective parts are constructed. Where the parts are metal (for example steel) flanges 9 may be welded in place. In the instance where a form of plastic is used, such as polyvinyl chloride, flanges 9 may alternatively be attached to central holding chamber 3 through solvent welding, heat welding or with the use of multi-purpose glue or epoxy. The same process applies to the methods of attaching flanges 8 to each of the end caps 6 and 7. As shown in FIG. 2, when end caps 6 and 7 are placed over the upper or lower ends of central holding chamber 3, flanges 8 and 9 align such that flange bolts 10 may be used to secure the ends caps in place. A fluid tight seal is provided between the respective flanges through the use of a gasket 11.

Flanges 8 and 9 may also be connected by alternative methods, such as welding, bolting, screwing or through the use of compression fittings to secure the end caps 6 and 7 to central holding chamber 3. Further, end caps 6 and 7 may in some cases be directly attached to central holding chamber 3, without the use of flanges, by devices such as brackets, clamps or compression fittings.

As is apparent from FIGS. 1 through 3, end caps 6 and 7 preferably have a generally concave internal surface such that internal vessel pressure bears on the concave side. While various other shapes could equally be utilized and remain within the scope of the present invention, the generally concave shape of end caps 6 and 7 serves two principal functions. First, the nature of the shape of the end caps is such that they are able to withstand relatively high internal pressures without failing or bulging, whereas in prior art devices which use flat headers it was necessary to add strengthening members or ribs across the ends for added strength in order to prevent distortion or bulging during operation. In contrast, the concave shape of end caps 6 and 7 allows for apparatus 1 to be used in situations having high operating pressures without the need for stiffening or strengthening members. The concave shape also permits end caps 6 and 7 to be made of a relatively thin material resulting is a lighter vessel.

The second function of the concave shaped end caps 6 and 7 is to assist with the flow of fluid through vessel 2. In the preferred embodiment upper and lower end caps 6 and 7 each contain at least one end port 12. In the configuration shown in FIGS. 1 through 3, a single end port 12 is shown positioned centrally in each of end caps 6 and 7. It will be appreciated that positioning end ports 12 in this manner, and through the use of concave shaped end caps, fluid that enters into one end of vessel 2 is, in essence, funnelled or directed toward the end port 12 in the opposite end cap. Upper end cap 6 also helps to direct the flow of fluid across the entire end of central holding chamber 3. Accordingly, the concave shape of end caps 6 and 7 removes the possibility of having pockets of fluid remaining stagnant within the vessel. They also remove the need for the insertion of additional fluid flow directing means to ensure complete evacuation of fluid from the vessel.

It will be appreciated that the structure and configuration of vessel 2 provides an enclosed vessel having end caps that are releasably securable to central holding chamber 3 by the use of flanges 8 and 9. With flanges 8 and 9 being secured together by flange bolts 10, either upper end cap 6 or lower end cap 7 can at any time be readily removed in order to clean the interior of vessel 2 or remove or change any internal parts or components. However, in an alternative embodiment (not shown) end caps 6 and 7 could be permanently fixed to the walls of central holding chamber 3 in order to provide a sealed, single piece enclosed vessel.

In order to prevent corrosion and reaction with fluids that pass through apparatus 1, central holding chamber 3, end caps 6 and 7, flanges 8 and 9 and end ports 12 are preferably comprised of a corrosion resistant material. Alternatively, these components may be coated with a corrosion resistant material.

Referring now to FIGS. 2 and 3, contained within central holding chamber 3 is an ion exchange bed 13. Ion exchange bed 13 is composed of ion exchange particles which are packed within central holding chamber 3 to form the bed. Bed 13 is capable of taking-up components from fluid that is passed therethrough. It will be understood by those familiar with the art that the particular form of particles which are utilized will be dependent upon the application in which vessel 2 is to be used. For example, where the vessel is used in a water de-ionization system to remove cations from water, a strong acid cation resin could be used.

Typically the size of the individual ion exchange particles forming ion exchange bed 13 would be in the range of 80 to 120 U.S. mesh (175 to 125 micrometers), however, other sizes may be used as appropriate to improve the economics and/or the efficiency of a particular process. By using fine mesh particles there is a reduction of hydrodynamic mixing at the fluid (being treated) and regenerant interface and a reduction in contamination due to the finite diffusion rates of constituents of one fluid coming from the ion exchange particle when the particle is contacted with the other fluid. It will be understood by those skilled in the art that, for a given volume of ion exchange particles, the smaller the particle size the greater the surface area that fluid passing through the ion exchange bed is exposed to and the shorter will be the diffusion distance within the particles. As a result, exchange kinetics are improved.

In order to maintain ion exchange bed 13 within central holding chamber 3, upper and lower retaining means, 14 and 15 respectively, are used. Upper and lower retaining means 14 and 15 confine the ion exchange particles within central holding chamber 3 such that vessel 2 has an upper particle-free cavity 16 between upper retaining means 14 and upper end cap 6, and a lower particle-free cavity 17 between lower retaining means 15 and lower end cap 7. As also shown in FIG. 2, upper and lower particle-free cavities 16 and 17 are in communication with end ports 12 extending through upper and lower end caps 6 and 7.

Upper and lower retaining means 14 and 15 are comprised in part of upper and lower perforated or permeable meshes, 18 and 19 respectively, having perforations or openings therethrough. Meshes 18 and 19 cover the respective upper and lower surfaces of ion exchange bed 13 in order to prevent the escape of ion exchange particles from central holding chamber 3 and into upper and lower particle-free cavities 16 and 17. It will be appreciated that in order to accomplish this function meshes 18 and 19 must have openings smaller than the size of the smallest individual ion exchange particle. In addition, to prevent corrosion and reaction with fluids passing through vessel 2, meshes 18 and 19 are preferably made from polypropylene or some other similar material.

As shown in FIG. 3, upper and lower retaining means 14 and 15 further comprise upper and lower perforated plates 20 and 21. Plates 20 and 21 hold and support meshes 18 and 19 in place above and below said bed of ion exchange particles 13 and serve to hold and maintain each end of ion exchange bed 13 in a flat configuration so that ion exchange bed 13 is maintained at a substantially uniform depth during the process. Fluid flowing into vessel 2 is thus presented with a flat surface over which the fluid will flow. Since the main function of plates 20 and 21 is to maintain each end of ion exchange bed 13 in a flat configuration, they are preferably comprised of a rigid material and have perforations which are large relative to the perforations through meshes 18 and 19. The perforations through plates 20 and 21 must be of a sufficient size such that the placement of plates 20 and 21, on top of the mesh on either side of ion exchange bed 13, will not substantially restrict the flow of fluid through vessel 2. For example, perforations or holes from about ⅛ inch to 1 inch in size have been found to be acceptable, however, it will be appreciated that depending upon the design criteria and operating conditions of apparatus 1, other sizes of openings may be utilized. Additionally, the size and placement of the perforations in the plates must not compromise the strength of the plates. Once again, in order to prevent corrosion and reaction with fluids being passed through vessel 2, plates 20 and 21 are preferably comprised of polypropylene or other suitable material, including, CPVC, PVC, and ceramics. Alternatively, plates 20 and 21 may be coated with a corrosion resistant material.

Referring again to FIG. 3, it will be seen that upper and lower retaining means 14 and 15 further include perforated upper and lower bottom sheets 22 and 23. Upper and lower bottom sheets 22 and 23 are positioned between upper and lower meshes 18 and 19 and the respective upper and lower surfaces of ion exchange bed 13. That is, upper and lower meshes 18 and 19 are effectively sandwiched between their respective upper and lower plates and upper and lower bottom sheets. These three components can be physically joined together to form a single overall structure or may be merely held in place as single layers over ion exchange bed 13.

Upper and lower bottom sheets 22 and 23 provide support for meshes 18 and 19 so that the meshes are prevented from impinging into central holding chamber 3 when there is no support from ion exchange bed 13. Also, as in the case of the upper and lower plates 20 and 21, upper and lower bottom sheets 22 and 23 in the preferred embodiment are configured such that they do not substantially affect the flow of fluid through vessel 2. In their simplest form, upper and lower bottom sheets 22 and 23 may take the form of a ring around the outer edge of ion exchange bed 13 to act as a retaining ring to ensure that the meshes are not pulled into central holding chamber 3 when not fully supported by bed 13. However, in the preferred embodiment upper and lower bottom sheets 22 and 23 extend across the top and bottom surface of ion exchange bed 13 but have perforations or holes therethrough such that fluid flow is not restricted significantly. Since upper and lower bottom sheets 22 and 23 only prevent the impingement of meshes 18 and 19 into central holding chamber 3, the perforations or holes through bottom sheets 22 and 23 may be larger than those through plates 20 and 21. Through the use of larger perforations, any affect on fluid flow is even further reduced. The perforations through upper and lower bottom sheets 22 and 23 preferably have a size greater than the perforations in upper and lower plates 20 and 21. In order to prevent corrosion and reaction with fluids being passed through vessel 2, bottom sheets 22 and 23 are preferably comprised of, or are coated with, a corrosion resistant material.

While the openings through plates 20 and 21 and through bottom sheets 22 and 23 have been described as perforations, they may in fact comprise any form of opening that can be cut, bored, punched, drilled or formed in any other manner through the plates or bottom sheets, including openings created through extrusion methods of manufacturing. Furthermore, plates 20 and 21 and bottom sheets 22 and 23 may be formed by joining strips or pieces of material together to form a grid or other support mechanism functioning essentially the same as a perforated plate or sheet.

Plates 20 and 21, meshes 18 and 19 and bottom sheets 22 and 23 may be held in vessel 2 by a number of methods. The most important factor in whatever method is chosen is to ensure that upper and lower retaining means 14 and 15 are arranged in the vessel so that ion exchange particles will not escape from central holding chamber 3 and enter particle-free cavities 16 and 17. In the preferred embodiment, flanges 9 are attached to central holding chamber 3 forming a ledge upon which bottom sheets 22 and 23, meshes 18 and 19 and plates 20 and 21 rest. Gasket 11 is then placed on flange 9 so that the gasket extends over the top of plates 20 and 21 to the inside edge of central holding chamber 3 (see FIG. 3). This ensures that when end caps 6 and 7 are tightly secured to central holding chamber 3 there is no avenue through which ion exchange particles can migrate into particle-free cavities 16 and 17 (see FIG. 2).

An alternative method of holding plates 20 and 21, meshes 18 and 19 and sheets 22 and 23 in vessel 2 involves the use of two gaskets on each of upper and lower flanges 8 and 9, placing meshes 18 and 19 between the two gaskets, and thereafter tightly compressing them in place by securing end caps 6 and 7 to central holding chamber 3. Here bottom sheets 22 and 23 rest on a ledge formed between flanges 9 and central holding chamber 3 with plates 20 and 21 being free standing on meshes 18 and 19. A still further method to hold these components in vessel 2 is to place plates 20 and 21, meshes 18 and 19 and bottom sheets 22 and 23 between two gaskets between each of flanges 8 and 9 and secure them tightly between the flanges by securing end caps 6 and 7 in place. It will of course be appreciated that additional methods may be utilized to hold plates 20 and 21, meshes 18 and 19 and sheets 22 and 23 in vessel 2 while remaining within the scope of the invention.

Figure 6:
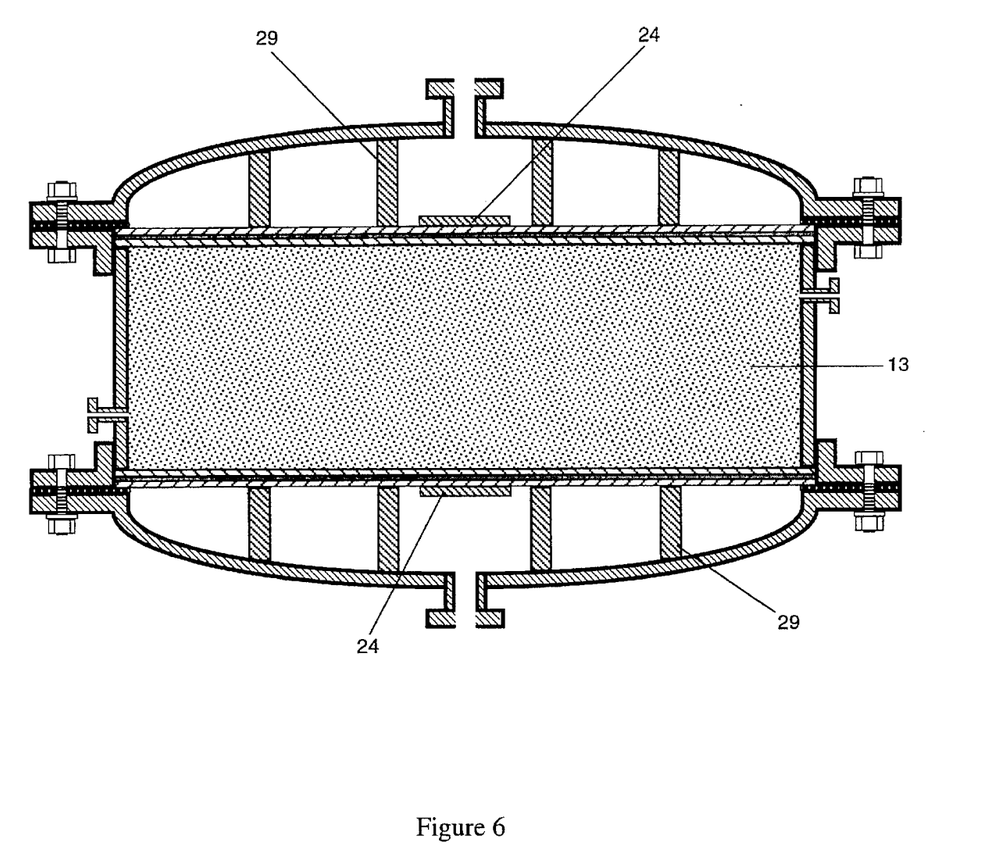
FIG. 6 is a sectional view of an alternate embodiment of the apparatus shown in FIG. 2.

As a further means to prevent impingement or jetting of fluid into ion exchange bed 13, baffles 24 are positioned at or directly below each end port 12. As shown in FIGS. 3 and 6, baffles 24 may be attached immediately below end ports 12 or, alternatively, may be positioned on upper and lower plates 20 and 21 in line with end ports 12. The function of baffles 24 is to help deflect the stream of fluid entering vessel 2 and to eliminate jetting or impingement of such fluid into ion exchange bed 13. Once again, as in the case of plates 20 and 21, bottom sheets 22 and 23 and meshes 18 and 19, baffles 24 are preferably comprised of, or are coated with, a corrosion resistant material.

In order to provide support to upper and lower plates 20 and 21, which support each end of ion exchange bed 13, upper and lower support means 25 and 26 are employed (see FIG. 2). Upper and lower support means 25 and 26 extend between upper and lower plates 20 and 21 and upper and lower end caps 6 and 7 such that plates 20 and 21 are held in a substantially flat configuration as the ion exchange particles swell during the ion exchange process. The precise configuration of support means 25 and 26 is not as critical as the fact that support means 25 and 26 should not impede the flow of fluid entering or leaving the ion exchange bed 13.

Support means 25 and 26 preferably comprise at least one support column which is positioned between the respective upper and lower plates 20 and 21 and end caps 6 and 7. Support means 25 and 26 may be permanently attached to plates 20 and 21, permanently attached to the interior surface of end caps 6 and 7, removably attached to either plates 20 and 21 or end caps 6 and 7, or may merely be free standing between end caps 6 and 7 and plates 20 and 21. In one embodiment of the present invention, and as shown in FIGS. 2 and 3, support means 25 and 26 comprise pipes 27 having open ends and perforations 28 through their walls. As shown, pipes 27 align with end ports 12 such that when fluid is introduced into vessel 2 through end ports 12 the fluid is able to pass through perforations 28 to fill particle-free cavities 16 or 17. Similarly, when fluid is extracted through an end port 12 it may be drawn through perforations 28.

In an alterative embodiment, as shown in FIG. 6, upper and lower support means 25 and 26 are comprised of support pegs or pillars 29. Pegs or pillars 29 may be solid or hollow support structures that, rather than aligning with end ports 12, are spaced in a substantially even configuration throughout particle-free cavities 16 and 17.

Figure 7:
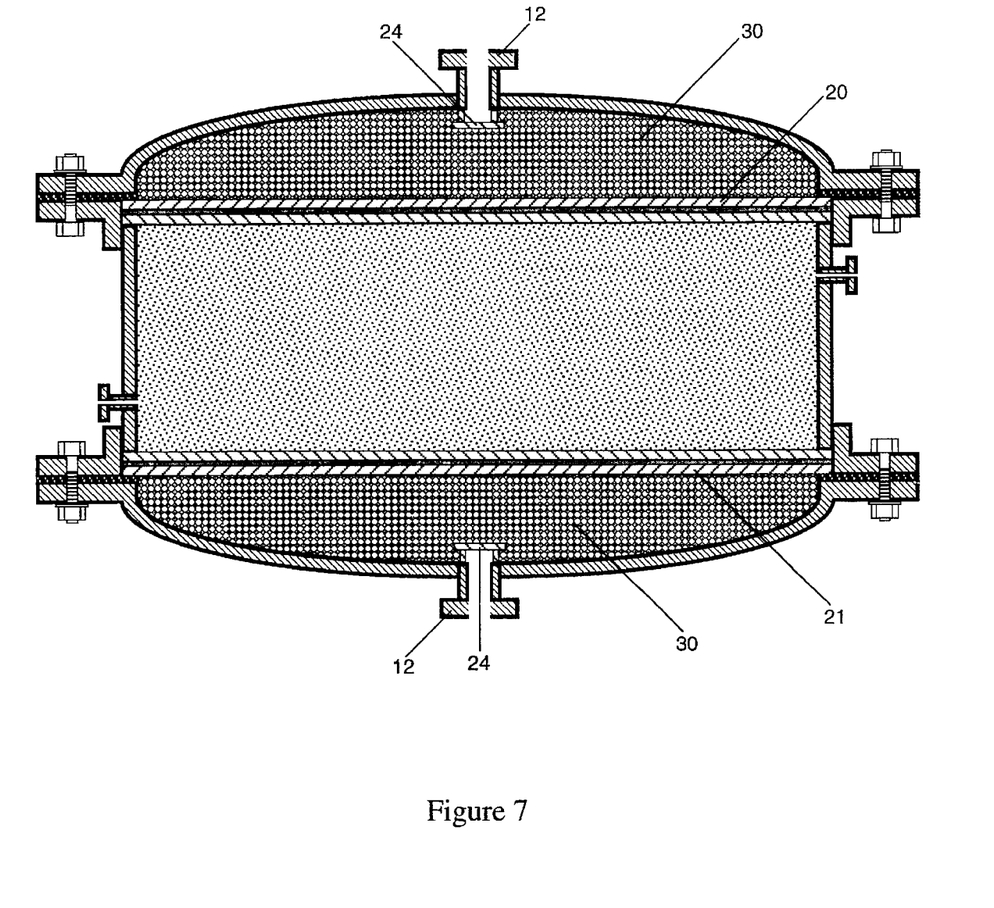
FIG. 7 is a sectional view of an alternate embodiment of the apparatus shown in FIG. 2.

A further variation of support means 25 and 26 is shown in FIG. 7. In FIG. 7 upper and lower support means 25 and 26 are comprised of a bed of inert beads 30 which substantially fill particle-free cavities 16 and 17. Beads 30 provide support for plates 20 and 21. As in the case of other forms of support means, it is important that beads 30 do not significantly restrict the flow of fluid through vessel 2. For that reason beads 30 must be of a relatively large size, as compared to the size of the ion exchange particles. For example, beads in the range of 2 to 3 mm in diameter, or larger, have been found to provide sufficient support for plates 20 and 21 while not significantly affecting or restricting fluid flow. In addition, in order to prevent the loss of beads 30 through end ports 12 it is necessary for baffles 24 to be positioned immediately adjacent to the end ports as shown in FIG. 7. It will be appreciated by those skilled in the art that, in this configuration, baffles 24 will contain appropriate screening around any openings so as to prevent beads 30 from entering end port 12. Beads 30 are preferably comprised of polypropylene or a similar material in order to be of sufficient strength to provide the necessary support and also for purposes of corrosion resistance. For the same reasons, the other variations of upper and lower support means are also preferably comprised of polypropylene or some other similar corrosion resistant material.

Figure 4:
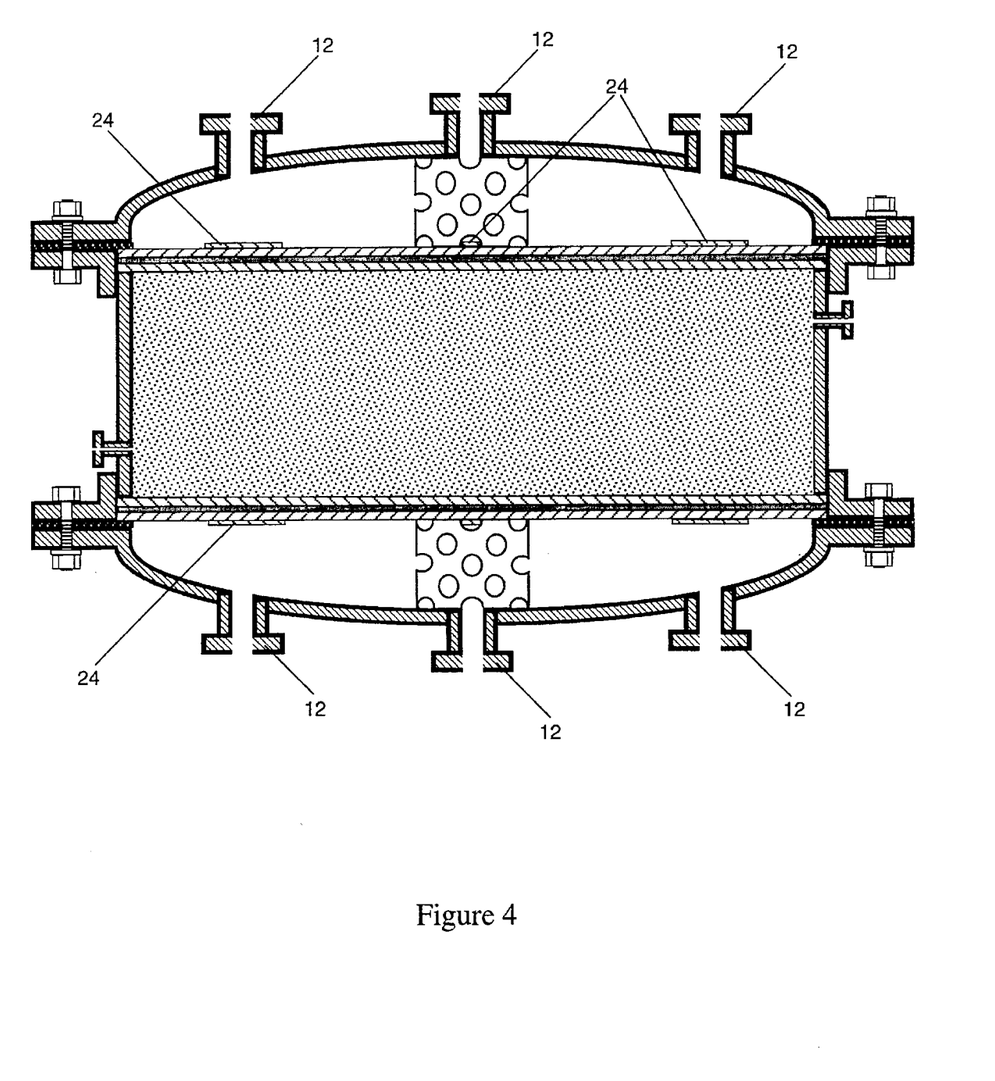
FIG. 4 is a sectional view of an alternate embodiment of the apparatus shown in FIG. 2.
Figure 5:
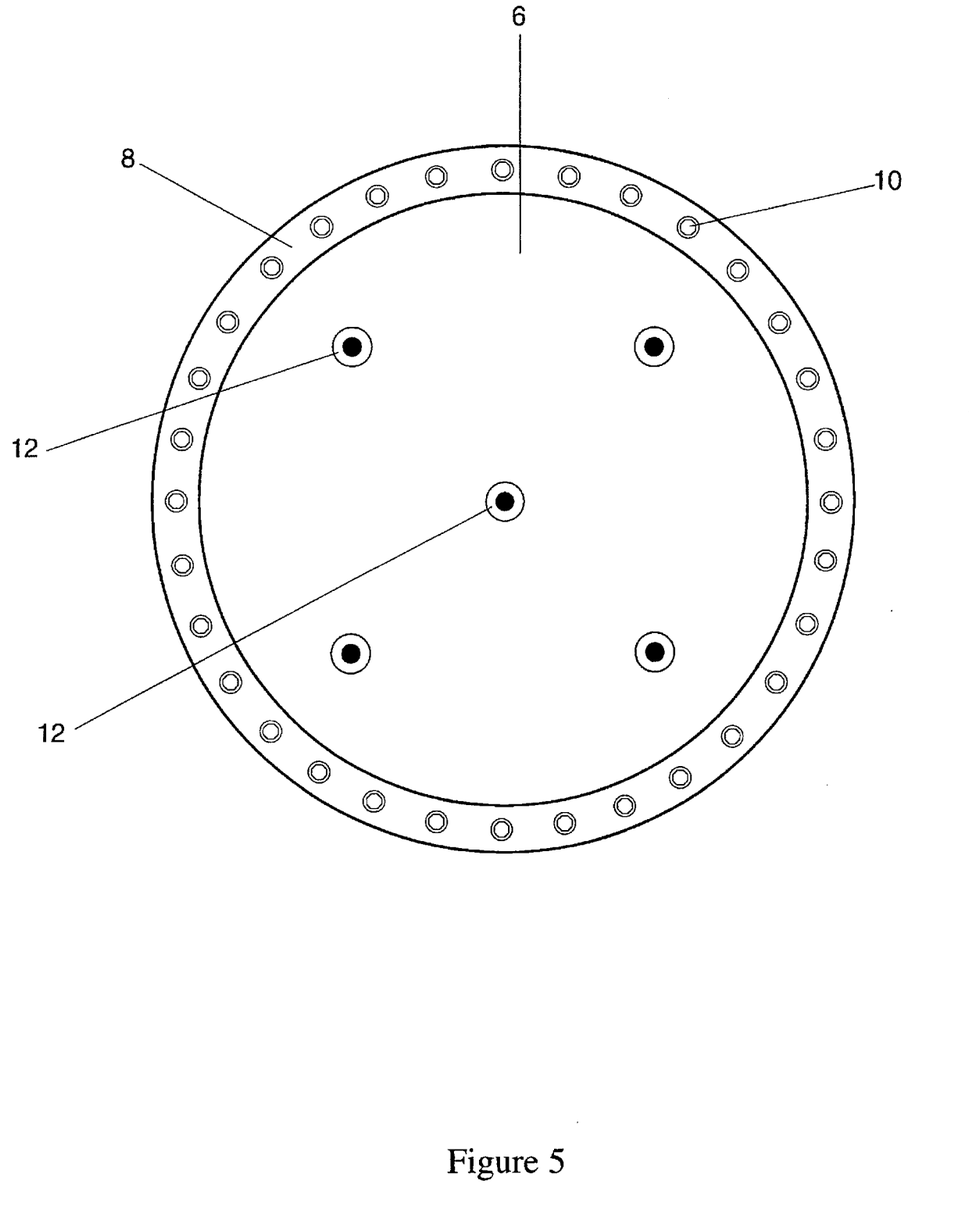
FIG. 5 is a plan view of the apparatus of FIG. 4.

In the preferred embodiment the height of ion exchange bed 13 is limited to less than 36 inches and preferably to less than 24 inches. There is no such limitation with respect to its diameter. The primary limitation for the diameter of ion exchange bed 13 is the physical structure of vessel 2 and the required flow rates through the vessel. The preferred embodiment of the present invention contains at least one end port 12 through each of upper and lower end caps 6 and 7. Where only one end port is used in each end cap, that end port should be located substantially in the centre of the end cap to ensure even flow distribution throughout vessel 2 and also to ensure that fluid drains from the vessel. Where multiple end ports are used, one port should remain located substantially in the centre of each end cap with the remaining ports distributed generally evenly about the cap. In addition, the number of end ports 12 through each end cap should be the same. FIGS. 4 and 5 show embodiments of the present invention wherein multiple end ports 12 are utilized. In applications where large diameter ion exchange beds are utilized, the use of multiple end ports 12 is recommended to assist in fluid flow through the vessel.

Referring again to FIGS. 2 and 3, central holding chamber 3 also contains at least one side port 31 that extends through the side of central holding chamber 3 for introducing and removing ion exchange particles into and from the chamber. Where more than one side port is used at least one of said side ports 31 is positioned near the upper end 4 of central holding chamber 3 and at least one of said side ports 31 is positioned near the lower end 5 of central holding chamber 3. By way of side ports 31, ion exchange particles may be introduced into central holding chamber 3 between upper and lower retaining means 14 and 15 to fill central holding chamber 3. In addition, side ports 31 may be used to remove ion exchange particles from the vessel, to introduce cleaning solution into the vessel or to act as a port through which to inspect the interior of central holding chamber 3. As in the case of the other component parts of apparatus 1, side ports 31 are also constructed from, or coated with, a corrosion resistant material.

It will be appreciated that while it is desirable to use at least two side ports for efficiency and economy of operation, apparatus 1 may also be used with a single side port, or no side ports, without affecting the efficiency of the ion exchange process. Through ensuring that at least one side port is positioned near the top of central holding chamber 3 and one positioned near the bottom of the chamber, ion exchange particles may be introduced and packed within central holding chamber 3 and may also be readily removed leaving the chamber evacuated. That is, through the use of multiple side ports ion exchange particles may be added, removed or cleaned without the need to remove either upper or lower end caps 6 or 7. There is, therefore, a significant savings in downtime and associated costs when changing or cleaning the ion exchange particles or when the interior of the vessel needs to be cleaned or inspected. Introducing ion exchange particles into central holding chamber 3 through side ports 31 also enables the ion exchange particles to be substantially uniformly distributed as the ion exchange bed is formed to ensure even particle distribution and a relatively homogeneous packing of the highest density while eliminating overly dense areas that may result through using the prior art method of mounding the ion exchange particles and compressing them into the vessel through the use of flat headers.

In operation, vessel 2 is assembled with end caps 6 and 7 attached to central holding chamber 3 and with upper and lower retaining means 14 and 15 positioned at the ends 4 and 5 of central holding chamber 3. Upper and lower support means are situated between end caps 6 and 7 and retaining means 14 and 15. As discussed, retaining means 14 and 15 are preferably comprised of a sandwich type assembly having a mesh between a plate and a bottom sheet. For added strength, durability, and to enhance fluid flow over the top of the ion exchange bed, a plurality of meshes may be used, provided that the layers of mesh do not substantially restrict the flow of fluid through the vessel. Where a plurality of meshes is used it will be understood by those skilled in the art that only the layer of mesh adjacent to ion exchange bed 13 need have openings smaller than the smallest ion exchange particle.

In accordance with established packed bed technology, the ion exchange particles are closely packed in a relatively fixed arrangement. As discussed, it is important when preparing the ion exchange bed to obtain a uniform packing density and to avoid loosely packed zones or the formation of especially dense areas as either of these situations can lead to channelling and an overall reduction in efficiency.

Any number of methods of loading the ion exchange particles into central holding chamber 3 may be used as long as the particles form a substantially homogeneous packed bed. In the preferred embodiment the ion exchange particles are loaded in the form of a slurry. A separate reservoir is filled with a liquid/ion exchange particle slurry and connected to the assembled vessel via at least one side port 31. Prior to introducing the slurry of ion exchange particles, the vessel should be filled with water or other suitable liquid to ensure that all air is excluded from the vessel. Slurried ion exchange particles are then pumped from the reservoir into central holding chamber 3 until central holding chamber 3 is filled. Particle retainers in the remaining side ports allow for the escape of liquid but retain the ion exchange particles within central holding chamber 3. Preferably the liquid used to form the slurry is such that it results in the least amount of swelling of the ion exchange particles and therefore a packed bed of a relatively high density. The use of multiple side ports is desirable when loading larger diameter vessels as this reduces the loading time and helps distribute the ion exchange particles evenly in central holding chamber 3. This is particularly desirable where non-uniform particle sizes are used.

Alternatively, ion exchange particles may be loaded manually into central holding chamber 3 through upper end 4 prior to assembly of apparatus 1. Generally manual loading of the ion exchange particles without the use of a slurry injected through one or more side ports 31 is more difficult and more time consuming. However, regardless of the loading method that is used it is important that air not be entrapped in the ion exchange bed as the presence of air can lead to void spaces in the packed bed and subsequent channelling during fluid flow.

When it becomes necessary to remove the ion exchange particles from central holding chamber 3 a process similar to that as described for loading the ion exchange particles is preferably used. First, end ports 12 are closed off using valves or other similar type structures after which one or more side ports 31 are connected to tubes or hoses through which water or other appropriate liquid is pumped to flush the ion exchange particles from the chamber. Once the ion exchange particles have been removed from central holding chamber 3 the interior of vessel 2 may be inspected by inserting an inspection mirror, light, video probe or other such device through any of the end ports or side ports. Alternatively, either upper or lower end caps 6 or 7 can be removed, together with the corresponding plate, mesh and bottom sheet, and the ion exchange particles can then be manually removed from central holding chamber 3. It will be appreciated that where only one side port exists, the ion exchange particles may be flushed out through that side port by pumping fluid in through one or more end ports 12 in end caps 6 and/or 7.

In the preferred embodiment, the ion exchange particles are loaded and packed such that the void space is less than about 40 percent. It will be appreciated by those skilled in the art that as ion exchange particles essentially operate and function as a bed of particles, the packed bed of ion exchange particles within central holding chamber 3 will have the effect of creating a pressure drop across the bed. That is, when vessel 2 is in operation and filled with pressurized fluid through upper end cap 6 there will be a pressure drop across ion exchange bed 13 in central holding chamber 3 such that the fluid pressure in upper particle-free cavity 16 is greater than the fluid pressure in lower particle-free cavity 17.

It will also be appreciated that through decreasing the size of the ion exchange particles in ion exchange bed 13, the relative pressure drop across the bed will be greater. For example, assuming laminar flow, incompressible fluid and solid spherical particles, and utilizing a packed ion exchange bed with a height of 24" and a flow rate of 4 gallons per minute per square foot, it has been calculated that an aqueous solution of 5 percent hydrochloric acid has a pressure drop in the range of 1–2 psi over the bed of packed ion exchange particles where the ion exchange particle size is between 16 and 50 U.S. mesh. With an ion exchange particle size of between 50 and 80 U.S. mesh, under the same conditions it has been calculated that the pressure drop across the bed is in the range of 7–10 psi. Furthermore, again under the same conditions but with a particle size of 80 to 120 U.S. mesh, a pressure drop in the range of 20–25 psi has been calculated.

While there will be a significant pressure drop across the ion exchange bed 13, the operating pressures of vessel 2 are considerably higher. Vessel 2 is designed to operate at a sufficiently high internal pressure to overcome the pressure drop of the ion exchange bed and to allow fluid to move progressively through the vessel.

In order to provide a more even distribution of fluid flowing into the vessel, and for even collection of fluid flowing out of ion exchange bed 13, as indicated, there are one or more end ports 12 located in each of the upper and lower end caps 6 and 7. When fluid is introduced through end port 12 in upper end cap 6 it fills upper particle-free cavity 16 creating a pressure head above ion exchange bed 13. That pressure head drives fluid through upper plate 20, upper mesh 18, and upper bottom sheet 22 and through the bed of ion exchange particles. Permeable upper mesh 18 acts to help smooth the flow of fluid and reduce any turbulence prior to the fluid entering the bed of ion exchange particles. In addition, it will be appreciated that the packed bed of ion exchange particles and the associated pressure drop across that bed will itself act as a flow distributor and helps to maintain a substantially uniform flow of liquid across the entire bed. This method of using the bed of ion exchange particles to act as a form of flow distributor requires that upper particle-free cavity 16 be full of pressurized fluid. The end port placement, associated baffles and concave nature of upper end cap 6 also assists in the uniform distribution of fluid across the bed of ion exchange particles. In addition, the concave nature of lower end cap 7 acts to provide uniform collection of fluid leaving ion exchange bed 13.

Fluid progresses through ion exchange bed 13 by what is known as plug flow. That is, fluid flows substantially evenly through the ion exchange bed as a plug of material until it reaches the opposite end and is pushed through the lower bottom sheet 23, lower mesh 19 and lower plate 21. At that point fluid enters lower particle-free cavity 17 and then is directed to end port 12 in lower end cap 7 for evacuation out of vessel 2. The concave shape of end cap 7 assists in directing the fluid through end port 12.

When reversing the flow of fluid through vessel 2 the operation is identical as are the mechanics and kinetics of the procedure. By pumping regenerate fluid into vessel 2 by way of end ports 12 in lower end cap 7, the ion exchange particles can be regenerated in situ. Once regenerated, fluid flow can again be reversed with the fluid to be treated being introduced through end cap 6.

It should also be appreciated that the configuration, structure and simplicity of vessel 2 and its internal components is such that it operates identically in either an upward or downward flow direction. In fact, while references have been made to "upper" and "lower" components, the entire vessel 2 could be turned upside down and operated in an identical fashion. That is, the upper portion of vessel 2 is in essence a mirror image of the lower portion. This presents the advantage of versatility in that the vessel can be operated equally in either direction and also a lower capital cost as the various component parts are identical with each end.

Furthermore, to those skilled in the art of reciprocating flow ion exchange and who appreciate the significance of fluid density effects, it will be apparent that the fluid to be treated can also enter the bottom of the vessel, as opposed to the top. In such circumstances, regeneration will still be in a counter-current direction; in this case, from the top of the vessel.

Regardless of the direction of flow, the combination of upper and lower retaining means and upper and lower particle-free cavities allow the present invention to utilize the packed bed of ion exchange particles as a form of flow distributor over the ends of the bed. This ensures even distribution across the upper and lower ends of the ion exchange bed and also ensures that all of the ion exchange bed is utilized without the need for elaborate, complicated or expensive flow distributors and collectors positioned next to the two surfaces of the ion exchange bed.

It is to be understood that what has been described are the preferred embodiments of the invention and that it is possible to make variations to these embodiments while staying within the broad scope of the invention. Some of these variations have been discussed while others will be readily apparent to those skilled in the art to which this invention relates. For example, while the use of upper and lower bottom sheets 22 and 23 has been discussed it will be appreciated that in some instances meshes 18 and 19 may be placed directly over the ends of ion exchange bed 13.

I claim:

1. An apparatus for treating a fluid to remove at least part of a component or components from the fluid in a reciprocating flow ion exchange system, the apparatus comprising:

an enclosed vessel having a central holding chamber that contains a packed bed of ion exchange particles, said ion exchange particles capable of taking up said component from said solution and capable of being regenerated in situ;

upper and lower retaining means disposed within said vessel to confine said bed of ion exchange particles within said central holding chamber in a substantially flat configuration, said enclosed vessel having a cavity free of said ion exchange particles above said upper retaining means and below said lower retaining means, each of said particle-free cavities being in communication with at least one end port extending through said vessel for introducing or removing fluid from said vessel; and, upper and lower support means disposed within said vessel adjacent to said upper and lower retaining means, for maintaining said upper and lower retaining means in place, and also for maintaining said packed bed of ion exchange particles in said substantially flat configuration, said upper and lower support means comprising support columns in the form of pipes having perforations through their walls, said pipes aligning with said end ports such that when fluid is introduced into said vessel through said and ports said fluid passes through said perforations in said pipes and into said particle-free cavities, said pipes not substantially restricting the flow of fluid through said vessel.

2. An apparatus as claimed in claim 1 wherein the flow of fluid into said vessel is substantially evenly distributed across the ends of said packed bed of ion exchange particles by the pressure drop through said bed of ion exchange particles when one of said particle free cavities is filled with pressurized fluid.

3. An apparatus as claimed in claim 2 wherein said upper and lower retaining means comprise upper and lower permeable meshes having perforations or openings therethrough, said upper and lower meshes covering the respective upper and lower ends of said bed of ion exchange particles preventing the escape of ion exchange particles from said central holding chamber while allowing for the substantially unrestricted flow of fluid through said vessel.

4. An apparatus as claimed in claim 3 wherein said upper and said lower retaining means further comprise upper and lower perforated plates to hold said upper and lower meshes in place above and below said ion exchange particles while not substantially restricting the flow of fluid through said vessel.

5. An apparatus as claimed in claim 4 wherein said upper and lower retaining means include upper and lower bottom sheets positioned between said respective upper and lower meshes and the ends of said bed of ion exchange particles, said bottom sheets providing support for said meshes and preventing impingement of said meshes into said central holding chamber while not significantly affecting the flow of fluid through said vessel.

6. An apparatus as claimed in claim 5 wherein said vessel includes a baffle which aligns with each of said end ports, said baffles helping to prevent impingement or jetting on said ion exchange particles by fluid when fluid is introduced into said vessel.

7. An apparatus as claimed in claim 6 having at least one side port extending through the side of said central holding chamber for introducing and removing said ion exchange particles into and from said central chamber between said upper and lower retaining means.

8. An apparatus as claimed in claim 7 wherein said vessel is enclosed through the use of releasably securable end caps, said end caps having internal surfaces adjacent to said central holding chamber that are generally concave.

9. The apparatus as claimed in claim 8 having at least two side ports, at lease one of said side ports being positioned near the top of said central holding chamber and at least one of said side ports being positioned near the bottom of said central holding chamber.

* * * * *